Dec. 27, 1938.  C. H. ARNOLD  2,141,333
CASH REGISTER
Original Filed June 16, 1934   6 Sheets-Sheet 1

Inventor
Charles H. Arnold
By
Carl Benst
His Attorney

Dec. 27, 1938.   C. H. ARNOLD   2,141,333
CASH REGISTER
Original Filed June 16, 1934   6 Sheets-Sheet 2

FIG. 2

Inventor
Charles H. Arnold
By
Carl Beust
His Attorney

Dec. 27, 1938. C. H. ARNOLD 2,141,333
CASH REGISTER
Original Filed June 16, 1934    6 Sheets-Sheet 3

Inventor
Charles H. Arnold
By Carl Benst
His Attorney

Dec. 27, 1938.   C. H. ARNOLD   2,141,333

CASH REGISTER

Original Filed June 16, 1934   6 Sheets-Sheet 4

THIS GROUP PRINTS ON STATEMENT SLIP

Inventor
Charles H. Arnold
By
*Pearl Benst*
His Attorney

Dec. 27, 1938.　　　　　C. H. ARNOLD　　　　　2,141,333
CASH REGISTER
Original Filed June 16, 1934　　6 Sheets-Sheet 6

Inventor
Charles H. Arnold
By Carl Benst
His Attorney

Patented Dec. 27, 1938

2,141,333

UNITED STATES PATENT OFFICE 2,141,333

CASH REGISTER

Charles H. Arnold, Dayton, Ohio, assignor to The National Cash Register Company, Dayton, Ohio, a corporation of Maryland Original application June 16, 1934, Serial No. 730,880. Divided and this application July 11, 1936, Serial No. 90,050

12 Claims. (Cl. 101—93)

This invention relates to improvements in cash registers of the type illustrated and described in Letters Patent of the United States Nos. 1,619,796, 1,747,397, and 1,761,542, issued respectively March 1, 1927, February 18, 1930, and June 3, 1930, to B. M. Shipley, and the copending application of M. M. Goldberg filed August 27, 1931, Serial No. 559,720, and is a division of applicant's application Serial No. 730,880, filed June 16, 1934, which application has now issued into Patent No. 2,141,332.

It is generally the custom for public utility companies that supply communities with electrical current and gas, to furnish their numerous subscribers with a periodical statement of their accounts. These statements are, as a general rule, composed of various detachable bills, coupons, and stubs; for example, a bookkeeping coupon, a subscriber's bill and coupon, and a collector's coupon. Upon each of these coupons, stubs, and bills various data and amounts are duplicated, and to this end a cash register of the type which simultaneously prints in a plurality of columns, otherwise known as a column printing register, is admirably adapted.

An object of the invention is to provide novel means to position certain of the type wheels independently of the differential mechanism.

A further object is to provide means to move the higher denomination amount type wheels to a non-printing position when no keys are depressed in the higher denomination amount banks.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Figs. 6 A and B combined constitute a front view of the printing mechanism.

Figs. 6 C and D combine to form a diagrammatic view of the type wheel driving lines.

General description

In its present embodiment the machine embracing the present invention is arranged for use by public utility companies that supply electrical current and gas to a plurality of consumers. However, it is not intended to limit this machine to any one system or use, as with slight alteration it may be adapted for use in many other ways, all coming within the scope of this invention.

Described in general terms, the present invention is embodied in the well-known type of cash register illustrated and described in the patents and applications referred to at the beginning of this specification. This machine is equipped with a column type printer located at the front of the machine, said printer being arranged to print in duplicate various amounts and data in the various columns of an insertable slip during one machine operation. In addition, a record of each transaction is printed in columnar alinement on an audit strip located at the right of the machine.

Detailed description

The present invention is embodied in the type of register illustrated and described in the patents referred to at the beginning of this specification. As machines of this character are well known in the art, the mechanism thereof will be but briefly described.

Machine framework and operating mechanism

Figure 2:
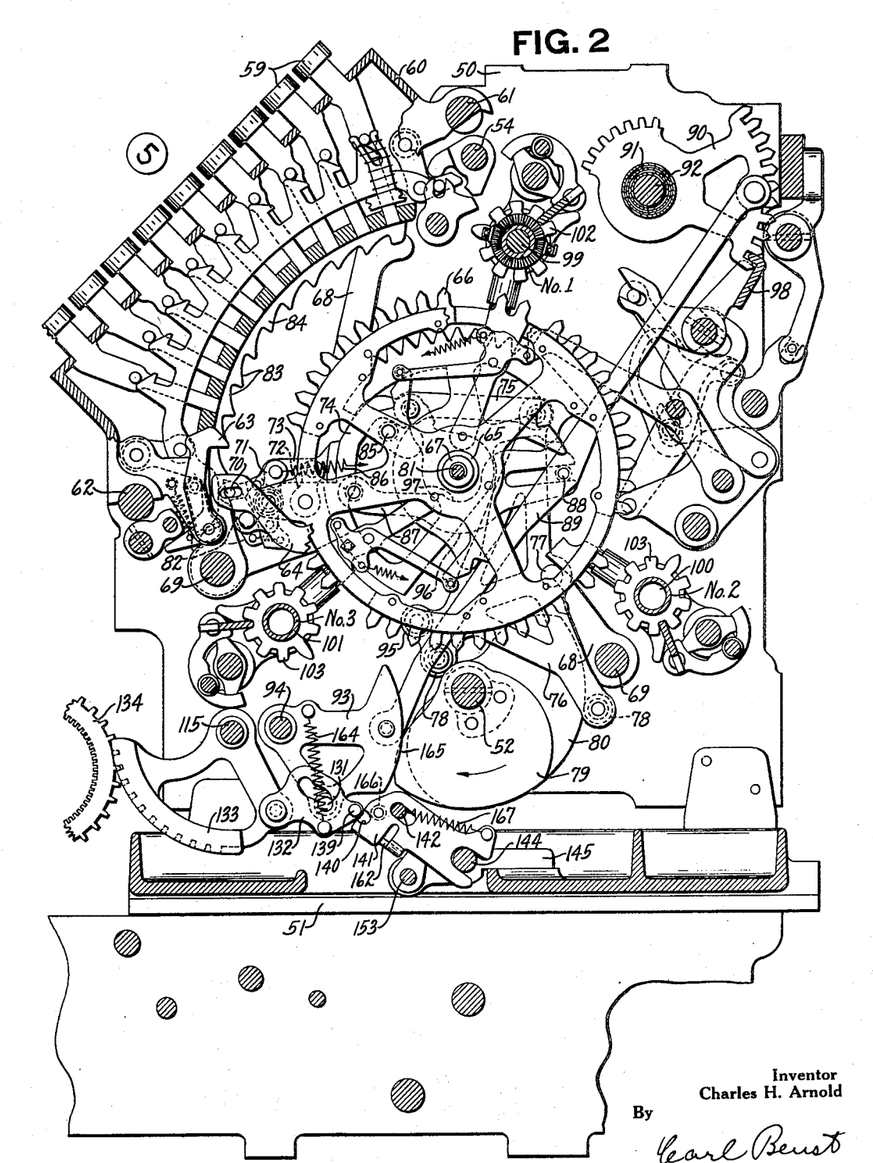
Fig. 2 is a sectional view showing in particular an amount bank and its associated differential mechanism.

Calling attention to Fig. 2, the mechanism of the machine proper is supported by two main frames 50, only one (the left frame) being here shown, and various other intermediate frames, cross frames, and braces. The main frames are in turn secured to a machine base 51 and the entire machine is enclosed in a suitable cabinet also secured to the machine base 51.

As a general rule the machine is operated by means of the usual electric motor (not shown) which is operatively connected to the main drive shaft 52 by the usual clutch mechanism and gearing.

Depressing the usual motor bar 53 (Fig. 1) releases a key lock shaft 54 (Fig. 2) for a slight clockwise movement under influence of a spring. This movement of the shaft 54 engages the clutch mechanism and closes the electrical circuit to the motor, thereby causing the machine to operate. Near the end of the machine operation the shaft 54 is rocked counterclockwise to release the depressed keys, disengage the clutch mechanism, and simultaneously open the motor switch in the usual manner.

If desired, or when electrical current is not available, the machine may be operated by means of a hand crank which is operatively connected to the main drive shaft 52 by means of a train of gears. Depressing the starting bar 53 (Fig. 1) releases the shaft 52 for rotation. The machine may then be operated by turning the hand crank.

As the motor, clutch, and releasing mechanism are of conventional design and old in the art, they have not been illustrated herein and will not be further described. However, reference may be had to the Shipley Patent No. 1,761,542 issued June 3, 1930, for a full disclosure of this operating mechanism.

Keyboard

Figure 1:
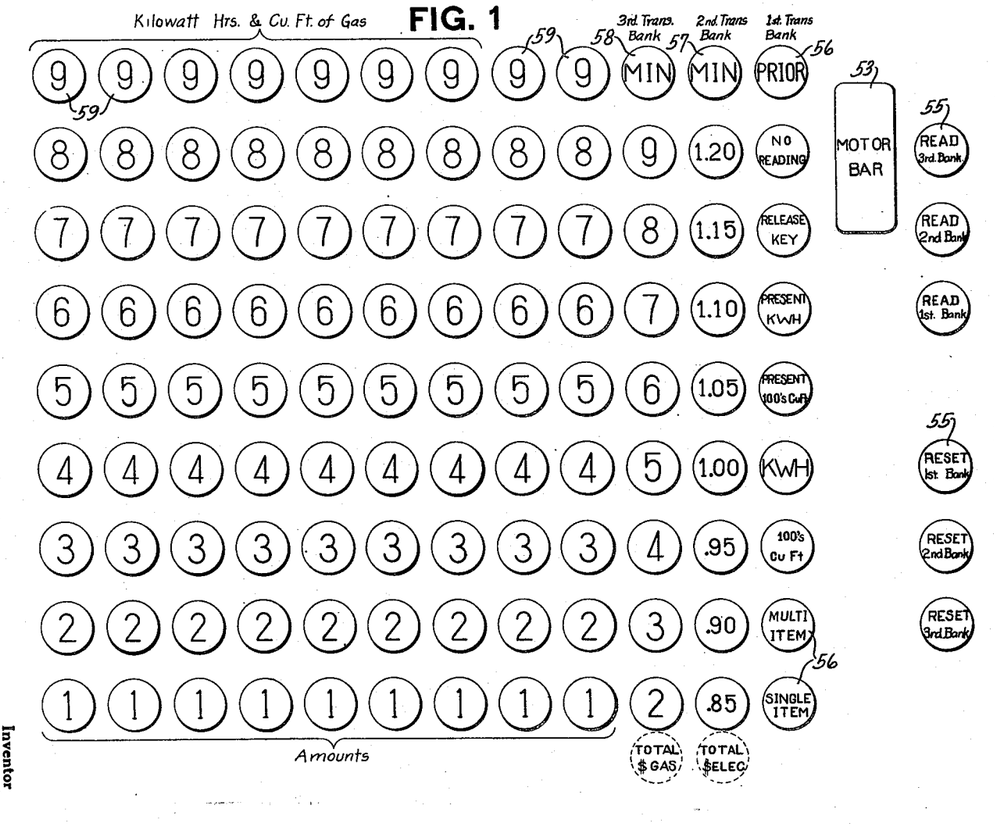
Fig. 1 is a diagrammatic view of the keyboard of the machine of the present invention.

Fig. 1 is a diagrammatic view of a typical keyboard arrangement for use by public utility companies.

Located at the extreme right of the keyboard is a series of total control keys 55 which control the reading and resetting of the different totalizers. Next in order is the motor bar 53 which, as previously stated, controls the operation of the machine. Next are three rows of transaction keys 56, 57, and 58, which select the different totalizers for engagement with their actuators in a manner later to be described. As presently constructed, the machine of this invention has nine rows of amount keys 59, which position the differential actuators in the well-known manner.

Amount keys and differential mechanism

As previously stated, the machine of this invention has nine banks 60 (Fig. 2) of amount keys 59, and, as all the amount banks and their associated differential mechanisms are similar, it is thought that the description of one denominational unit will be sufficient for the purpose of this invention.

Referring to Fig. 2, the amount key banks 60 are removably supported on rods 61 and 62 extending between and supported by the main machine frames 50. Pivoted on the lower end of each amount bank is a zero stop lever 63 having a right-angled projection arranged to cooperate with the forward end of a reset spider 64 pivoted on a hub 65 of an amount differential actuator 66. The actuator 66 is loosely mounted on a hub 67 extending between two differential support plates 68 (only one here shown) supported by a pair of rods 69 extending between the main frames 50. The spider 64 has in its forward end a slot through which extends a stud 70 in a differential latch arm 71 pivoted to the actuator 66.

Mounted for lateral shifting movement by means of the arm 71 and a similar arm 72 is a differential latch 73, a foot-shaped projection of which is arranged to cooperate with a differential driving segment 74 pivoted on the hub 67, and connected by a link 75 to a lever 76 journaled on a stud 77 secured in one of the plates 68. The lever 76 carries a pair of rollers 78 which cooperate with the peripheries of companion cams 79 and 80 secured on the main drive shaft 52.

In adding operations the shaft 52 and the cams 79 and 80 make one complete revolution clockwise, which, by means of the lever 76 and the link 75, rocks the driving segment 74 first in a clockwise direction and then back to normal position.

As previously stated, there is a differential actuator unit like that explained above, for each amount bank and each differential unit is supported between two of the plates 68. The complete assembly of differential units is held together by means of a rod 81 extending through the hubs 67.

If no key is depressed in an amount bank, the zero stop lever 63 engages the forward end of the reset spider 64 to rock the latch arm 71 counter-clockwise to move the differential latch 73 forwardly, thereby disengaging the foot thereof from the depression in the driving segment 74 and engaging a nose 82 of said latch with one of a series of notches 83 in a plate 84 secured to one of the plates 68. This stops the differential actuator 66 in zero position by disengaging said latch from the driving segment 74.

The concentric portion of the segment 74, in cooperation with the foot of the latch 73, maintains the nose of said latch in engagement with the plate 84 while said segment completes its initial movement clockwise and during the greater part of the return movement of said segment until the depression therein is opposite the foot of the latch 73. When the depression is opposite the foot of the latch 73, a flat surface of the segment 74 engages a stud 85 in the actuator 66 and returns said actuator to home position, thereby disengaging the reset spider 64 from the zero stop lever 63 and allowing a spring 86 to disengage the nose 82 of the latch 73 from the notch in the plate 84 and to reengage the foot of said latch with the depression in the driving segment 74.

Depressing one of the amount keys 59 forces the lower end of the stem thereof into the path of the latch arm 71. Consequently, initial movement clockwise of the segment 74 and the actuator 66 causes said arm 71 to engage the stem of said key to disengage the foot of the latch 73 from the segment 74 in exactly the same manner as explained above. On its return movement the segment 74 engages the stud 85 to return the actuator 66 and disengage the latch 73, as described above.

It will be also understood that depression of an amount key 59 rocks the zero stop lever 63 counter-clockwise out of the path of the spider 64, thereby allowing the actuator 66 to travel clockwise until stopped by the depressed amount key.

The differential positioning of the actuator 66 is transmitted to the indicator and printing mechanisms by means of a beam 87 pivoted on said actuator 66 and bifurcated to embrace a stud 88 in a link 89, the upper end of which is pivoted to an indicator segment 90 supported by one of a series of indicator tubes 91 on an indicator shaft 92, opposite ends of which are supported by the main frame 50. The lower end of the link 89 is pivoted to a printer segment 93 turnably supported on a rod 94, opposite ends of which are carried by the main frames 50.

After the actuator 66 has been positioned by a depressed amount key, as explained earlier herein, or by the totalizer wheel in total taking operations, in a manner later to be described, a roller 95 carried by the lever 76 engages an arcuate surface 96 of the beam 87 to force an arcuate surface 97 of said beam into contact with the hub 65. This, by means of the link 89, positions the segments 90 and 93 commensurate with the position of the actuator 66. The segments 90 and 93 in turn position the indicator mechanism and the printing mechanism in accordance with the amount set up on the keyboard or in total taking operations in accordance with the amount on the wheel of the totalizer being read or reset. Later in this specification the manner in which the segment 93 positions the type wheel will be explained.

An alining bar 98 (Fig. 2) cooperates with the segment 90 to maintain the indicator mechanism in position after the lever 76 has returned to home position, as here shown. At the beginning of machine operations the aliner 98 is disengaged from the segment 90 and is reengaged therewith after said segment 90 has been positioned as explained above.

*Totalizers*

By observing Fig. 2 it will be seen that the present machine has three lines of totalizers, the upper totalizer line 99, the rear totalizer line 100, and the front totalizer line 101. The upper totalizer line 99 supports an add and subtract totalizer and has an add wheel and a subtract wheel 102 for each denominational unit, these wheels being reversely geared together, so that one is always the complement of the other.

The totalizers are actuated under control of the amount keys 59 by the usual actuators 66, which are differentially controlled by the amount keys 59 through the medium of the usual form of latch mechanism consisting of a latch 73 and an arm 71 driven by a driving segment 74.

It is not thought necessary to go into any further description of either the totalizers or the differential mechanism in this divisional application. If a further description thereof is wanted, reference may be had to the above-mentioned parent application, Serial No. 730,880.

*Amount type wheel driving and amount zero elimination mechanisms*

Figure 3:
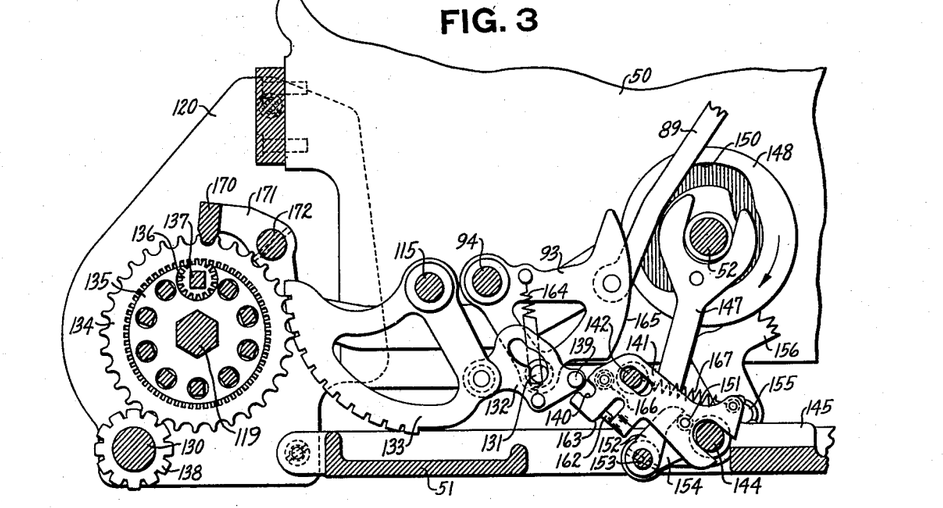
Fig. 3 is a sectional view of the mechanism for driving the type wheels of one denominational unit and also illustrating the zero elimination mechanism for that unit.

Fig. 2 is a section view taken just to the right of the $10.00 amount bank, while Fig. 3 constitutes a detail view of part of the mechanism shown in Fig. 2. By observing Figs. 2 and 3, together with Figs. 6 A, 6 B and 6 C and 6 D, it will be seen that the segment 93 carries a stud 131 which cooperates with a cam slot in a cam arm 132 pivoted to a gear segment 133 loose on the shaft 115. The gear segment 133 meshes with a ring gear 134 rotatably mounted on a disk 135 supported by the shaft 119. The internal teeth of the ring gear 134 mesh with a pinion 136 on a square shaft 137 and having a bearing in a circular opening in the disk 135. The external teeth of the ring gear 134 drive a ten dollar amount type wheel 138 while other pinions 136 (Figs. 6 C and D) on the shaft 137 drive ring gears 134 which in turn drive a series of type wheels in the different columnar locations on the shaft 130.

It will be noted by observing Figs. 6 C and 6 D that, although the groups of type wheels in the different columnar positions are all positioned by the amount differential mechanism, some of these type wheels are used to print data other than amounts. The groups used for printing data other than amounts have no type wheels driven by the units and tens of cents differential mechanism. This is due to the fact that these two lower denominations do not have zero elimination mechanism which is necessary on all the type wheels except those used to print amounts.

Figure 9:
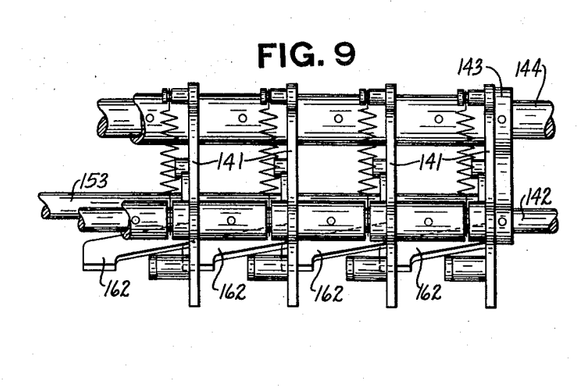
Fig. 9 is a top plan view of the zero elimination mechanism for the amount banks.

The cam arm 132 (Figs. 2 and 3) carries a stud 139 arranged to cooperate with a notch 140 in a zero elimination slide 141, the upper portion of which is slotted to receive a shaft 142 supported by a pair of arms 143 (Figs. 4 and 9) secured to a shaft 144 journaled in brackets 145 secured to the base plate 51. Secured on the shaft 144 (Figs. 3 and 4) is an arm 146 to which is pivoted a pitman 147, the upper end of which is bifurcated to embrace the hub of a box cam 148 secured on the shaft 52. The pitman 147 carries a roller 149 which cooperates with a cam groove 150 in the cam 148. The slide 141 (Figs. 3 and 5) has secured therein a stud 151 arranged to cooperate with a pawl 152 secured on a shaft 153 journaled in the brackets 145. Also secured on the shaft 153 is an arm 154 bifurcated to straddle a stud 155 in a cam lever 156 pivoted on a stud 157 carried by a bracket (not shown) secured to the base plate 51. The lever 156 carries rollers 158 and 159 which cooperate with the periphery of companion plate cams 160 and 161 secured to the shaft 52.

With the exception of the one cent and the ten cent amount banks there is one of the slides 141 for each amount bank. The slides 141 (Figs. 4 and 9) each have an extension 162 which cooperates with an abrupt surface 163 of the slide 141 for the next higher order denomination.

In order to illustrate how the zero elimination mechanism works, let us assume that the number five key in the ten dollar amount bank (Fig. 2) has been depressed. Initial movement clockwise of the differential latch and actuator mechanisms causes the latch to be broken or released from the driving segment in the fifth position, as explained earlier herein. After the actuator 66 has been thus positioned, the roller 95 on the lever 76, in cooperation with the beam 87 and the link 89, positions the segment 93 commensurate with the value of the depressed amount key. A spring 164 (Fig. 3) is tensioned to urge the arm 132 upwardly to normally maintain the lower portion of the slot therein in engagement with the stud 131. Consequently, when the segment 93 is positioned clockwise, the arm 132 acts in the same capacity as a solid link and positions the segment 133, the ring gear 134, and the tens of dollars type wheels 138 commensurate with the value of the depressed key in the ten dollar bank. The pinions 136 (Figs. 6 C and 6 D) position the other ring gears 134 and their associated type wheels as explained above.

Clockwise movement of the segment 93 moves an arcuate surface 165 (Figs. 2 and 3) thereof in the path of a roller 166 carried by the slide 141 to hold said slide in its normal position as here shown. This prevents the slide 141 from being moved forwardly by a spring 167 when the shaft 153 (Fig. 5) and the pawl 152 are rocked counterclockwise by the lever 156 in cooperation with the cams 160 and 161 immediately after the differential mechanism has completed its initial setting movement as explained above. It will be understood that setting movement of the differentials also returns the indicator segments 90 (Fig. 2) and the printer segments 93 to zero positions in amount banks where no key is depressed. The slide 141 for the ten dollar denomination, by means of the surface 163 thereon (Figs. 3 and 9) in cooperation with the extension 162, retains the zero elimination slide for the one dollar denomination in normal position. It will be recalled that zero elimination mechanisms are not provided in the units of cents and tens of cents denominations, consequently the zeros will print, in this instance, in the one dollar, the ten cent, and the one cent denominations.

Figures 4, 5:
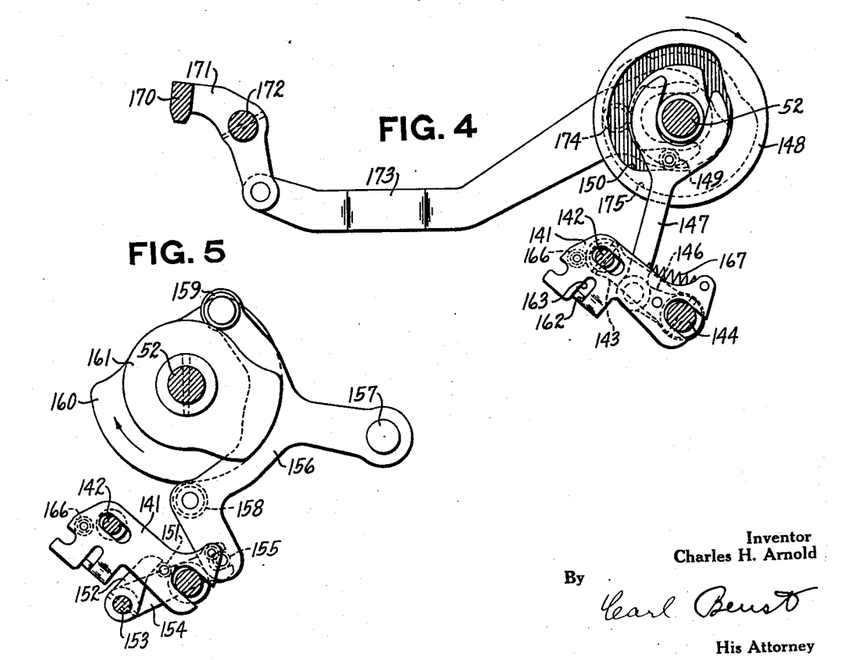
Fig. 4 is a detail view of the type wheel alining mechanism and the operating means for the zero elimination mechanism.
Fig. 5 is a detail view of the mechanism that controls the zero elimination slides.
Figure 6A:
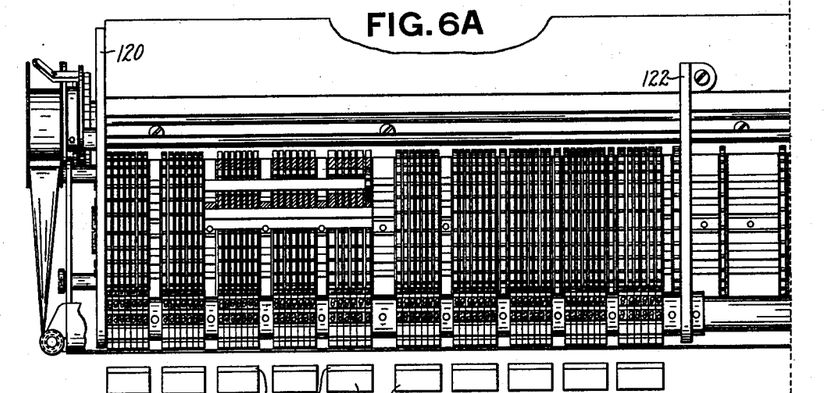
Figure 6B:
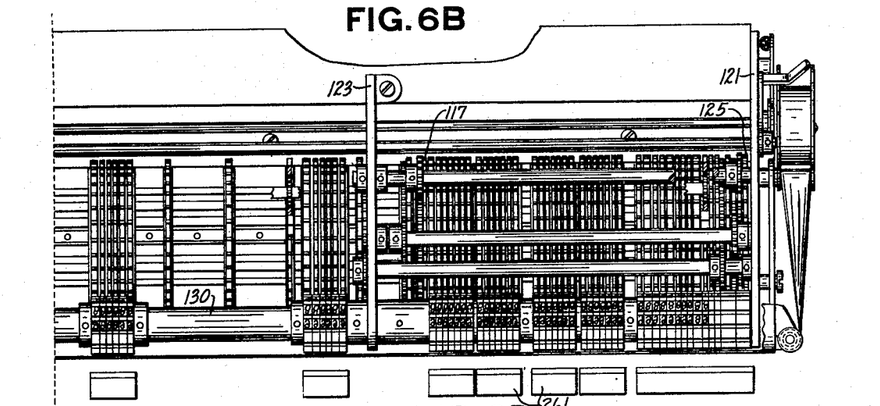
Figure 6C:
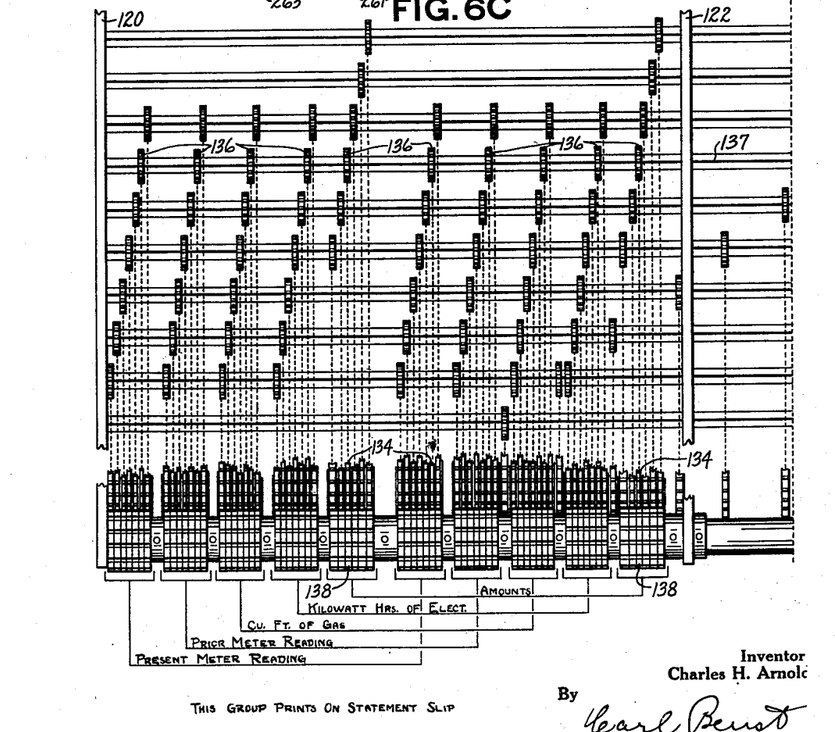
Figure 6D:
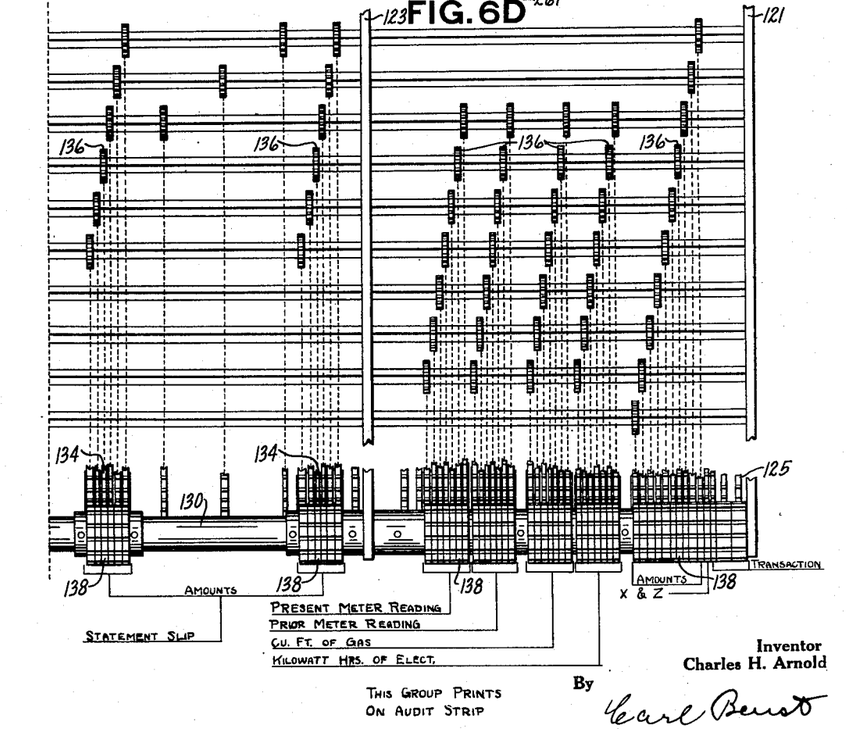

The zero elimination slides 141 for the higher denomination are not restrained, as is the slide 141 for the ten dollar denomination; therefore when the pawls 152 are rocked counter-clockwise, the springs 167 move said slides 141 forwardly, causing the notch therein to engage the studs 139 carried by the arms 132. Immediately thereafter, the cam 148 (Fig. 4) by means of the pitman 147 rocks the shaft 144, the arms 143, the rod 142, and the zero elimination slides 141 counter-clockwise (Fig. 4). This movement of the slides 141 rocks the arms 132 (Figs. 2 and 3) for the higher denominations clockwise, causing the cam slots therein in cooperation with the studs 131, which are at this time held stationary, to rock the segments 133 one position counter-clockwise. This, by means of the ring gears 134, pinions 136, and shaft 137 for the higher denominations, rotates the higher order type wheels one position beyond zero to a non-printing position, thereby eliminating the printing of zeros in these denominations.

Means for alining the type wheels is provided and is well illustrated in Figs. 3 and 4. This means consists of an alining bar 170 which cooperates with the ring gears 117, 125, and 134 (see also Figs. 6 A and 6 B). Arms 171 connect the alining bar 170 to a shaft 172 journaled in the plates 120, 121, 122, and 123. Pivoted to an extension of one of the arms 171 is a pitman 173 bifurcated to embrace a hub of the cam 148. The pitman 173 carries a roller 174 which cooperates with a raceway 175 in the lefthand face of the cam 148.

Just before the ring gears 134 receive any setting movement, the cam 148, by means of the pitman 173, rocks the arms 171, the shaft 172, and the alining bar 170 clockwise to disengage said alining bar from the ring gears 134. After the ring gears are positioned as explained above the cam 148 reengages the alining bar 170 with said ring gears to hold the type wheels in position while an impression is being made.

*Impression mechanism*

Figure 7:
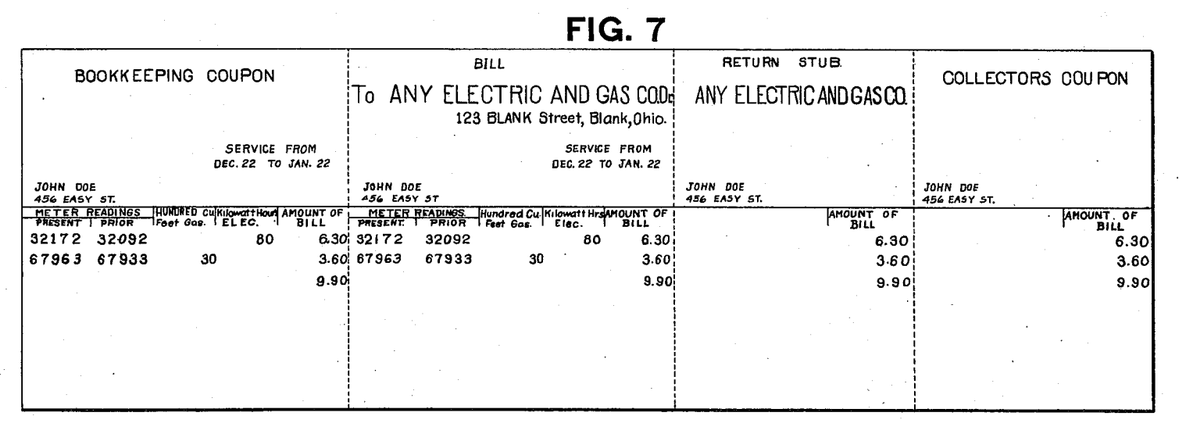
Fig. 7 is a facsimile of a statement slip used in the machine of the present invention.
Figure 8:
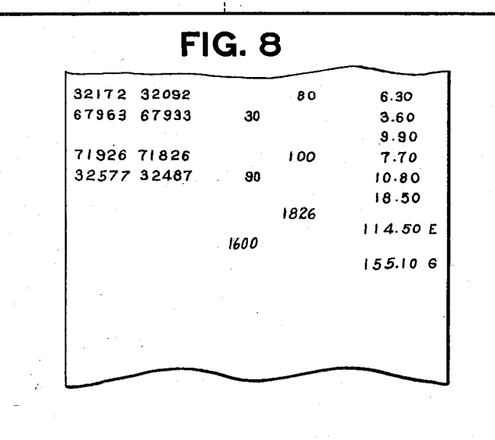
Fig. 8 is a facsimile of a fragment of an audit strip used in the machine of the present invention.

It is thought sufficient for the purposes of this divisional application to merely state that the impressions on the slip shown in Fig. 7 are made from the impression hammers 261 and 263 shown in Fig. 6 A, and that the impressions on the detail strip in Fig. 8 are made from the impression hammer 261 shown in Fig. 6 B. If a further description and illustration of these hammers are desired, reference may be had to the parent case, Serial No. 730,880.

*Statement slip feeding and ejecting mechanisms*

In the machine in which the present invention is embodied, the statement slip shown in Fig. 7 is presented to the feeding means by the operator, so that at the beginning of an operation of the machine, the slip is advanced by the slip feeding mechanism so that the first printing line thereon is alined with the impression mechanism or hammers above mentioned. Here again it is not thought necessary to go into any further description of the slip feeding and ejecting mechanisms, reference being had to the parent case for those descriptions.

*Detail feed*

The audit or detail strip, a portion of which is shown in Fig. 8, is adapted to be printed by this machine, the impression hammers 261 shown in Fig. 6 B being the hammers particularly constructed to make the impressions shown in Fig. 8. Further description of the detail mechanism is not believed necessary in this divisional application, and therefore attention is directed to the parent application, Serial No. 730,880, for further description and illustration, if desirable.

While the form of mechanism here shown and described is admirably adapted to fulfill the objects primarily stated, it is to be understood that it is not intended to confine the invention to the form or embodiment herein disclosed, for it is susceptible of embodiment in various forms, all coming within the scope of the claims which follow.

What is claimed is:

1. In a machine of the class described, the combination of type carriers; differential means to position the type carriers; means including a segmental gear to transmit the movement of the differential means to the type carriers; an element connecting the segmental gear to the differential means; and means shifted into engagement with the element under control of the differential means and operable when shifted to move the element and the segmental gear to position the type carriers independently of the differential means.

2. In an accounting machine, the combination of type carriers; a differentially positioned member; means including a segmental gear and an element to transmit the movement of the differentially positioned means to the type carriers; and means normally disconnected from the element and moved into engagement with the element under control of the differentially positioned means and operable through the element to move the segmental gear and the type carriers independently of the differentially positioned member.

3. In an accounting machine, the combination of type carriers; differential means including an element to position the type carriers; a segmental gear operatively connected to the type carriers; a member connecting the segmental gear and the element; and means normally disengaged from said member and engageable with the member when the element is in a certain position and operable when engaged with the member to move the member and the segmental gear relatively to the element to reversely rotate the type carriers independently of the differential means and the element.

4. In an accounting machine, the combination of type carriers; differential means including an element to position the type carriers; a segmental gear to drive the type carriers; a member connecting the segmental gear and the element; and means normally disengaged from said member and engageable with the member when the element is in a certain position and operable when in engagement with the member to move the member relatively to the element and the segmental gear, and to move the segmental gear relatively to the element to rotate the type carriers in a reverse direction.

5. In a machine of the class described, the combination of type carriers; means to drive the type carriers; an element; a member connecting the driving means and the element; means to differentially adjust the element, which adjustment is transmitted to the type carriers by means of the member and the driving means; and means normally disengaged from the member and engageable with the member when the element is adjusted in a certain position by the differential means and operable when in engagement with the member to move the member and the driving means independently of the element to move the type carriers to a non-printing position.

6. In a machine of the class described, the combination of type carriers; means to drive the type carriers; an element; means to differentially adjust the element; a member operatively connected to the driving means; a cam slot in the member; a projection on the element adapted to cooperate with the cam slot in the member; and means effective when the element is adjusted in a certain position to rotate the member, thereby causing the projection in cooperation with the slot to move the driving means relatively to the element to reversely rotate the type carriers.

7. In a machine of the class described, the combination of type carriers; an element; means to differentially adjust the element; means including a segmental gear and an arm to transmit the differential adjustment of the element to the type carriers; a member adapted for regularly excursioned oscillating movement and also adapted for reciprocating movement when the element is adjusted in a certain position; and means whereby initial reciprocating movement of the member connects said member to the arm so that initial oscillating movement of the member, by means of the arm and the segmental gear, moves the type carriers reversely.

8. In a machine of the class described, the combination of type carriers; an element; means to differentially adjust the element; means including a segmental gear and an arm to transmit the differential adjustment of the element to the type carriers; a turnably mounted member adapted to be operatively coupled to the arm; means to oscillate the member each machine operation; means to permit slidable movement of the member when the element is adjusted in a certain position to operatively couple said member to the arm; and means whereby oscillating movement of the member by means of the arm and segmental gear moves the type carriers independently of the element and the differential means.

9. In a machine of the class described, the combination of a type carrier; means to drive the type carrier; means to differentially adjust the driving means; a member pivotally connected to one of said means; a cam slot in said member; a projection in the other of said means cooperable with the cam slot in the member; said member serving to connect the driving means for operation by the differential means; and means, effective when the differential means is adjusted in a certain position, to rotate the member about its pivot, thereby causing the projection in cooperation with the slot to move the driving means relatively to the differential means to readjust the type carriers.

10. In a machine of the class described, the combination of a type carrier; means to drive the type carrier; means to differentially adjust the driving means, including an element; means to lock the element in differentially adjusted positions; coupling means for connecting the driving means to the element and including means to resiliently maintain a normal coupling relation between the driving means and the element; and means shiftable to engage the coupling means under control of said element and operable, when in engagement with the connecting means and when the element is locked, to move the driving means relatively to the element against the operation of the resilient means to thereby readjust the type carrier.

11. In a machine of the class described, the combination of a type carrier; a member operable to drive the type carrier; means to differentially position the type carrier; coupling means between the member and the differential means, including an element connected to said member and resiliently coupled to said means; means normally disengaged from said element and movable into engagement with the element under control of the differential means and operable when engaged with the element, to shift the element and the member independently of the differential means against the action of the resilient coupling between the element and the means, to thereby readjust the type carrier.

12. In a machine of the class described, the combination of a type carrier; differential means; means including an element to adjust the type carrier; a means pivoted on said element and connected to the differential means whereby the differential means adjusts the type carriers without moving said element on its pivot; means shiftable into engagement with said element when the element is in a certain position; and means to move the last-named means to rotate the pivoted means on its pivot to adjust the type carrier one step reversely while the differential means remains stationary.

CHARLES H. ARNOLD.